United States Patent Office 3,399,970
Patented Sept. 3, 1968

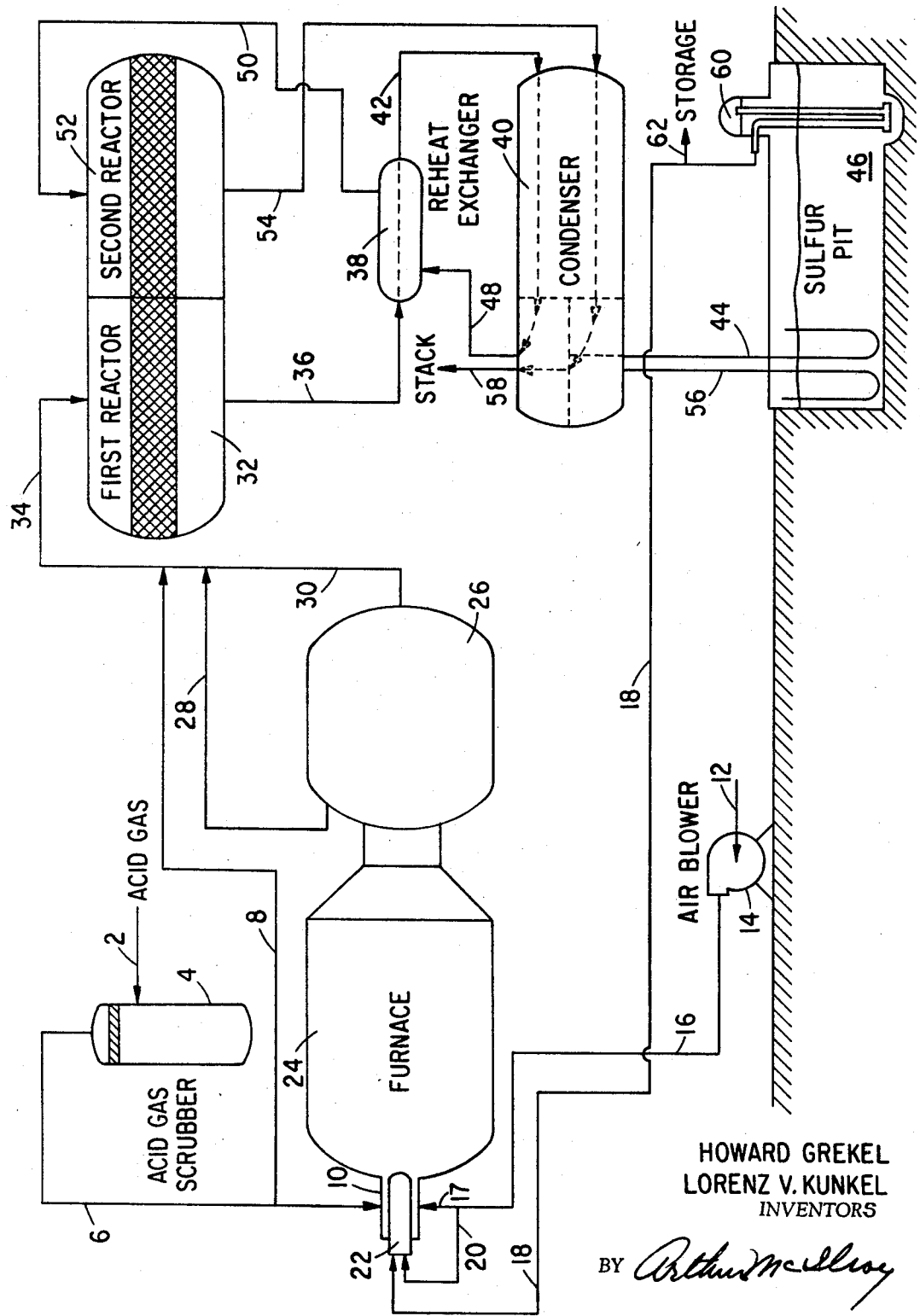

3,399,970
RECOVERY OF SULFUR FROM SOUR GAS BY THE SPLIT-FLOW PROCESS
Howard Grekel and Lorenz V. Kunkel, Tulsa, Okla., assignors to Pan American Petroleum Corporation, Tulsa, Okla., a corporation of Delaware
Filed Apr. 22, 1966, Ser. No. 544,430
7 Claims. (Cl. 23—225)

ABSTRACT OF THE DISCLOSURE

In the split flow process for the recovery of sulfur from a gaseous mixture containing hydrogen sulfide, and where the hydrogen sulfide content is less than 15%, stable combustion is maintained by burning sulfur with the hydrogen sulfide under conditions minimizing sulfur trioxide formation.

---

The present invention relates to the recovery of free sulfur from sour natural gas, refinery gas, and similar mixtures containing hydrogen sulfide. More particularly it is concerned with a method for recovering elemental sulfur from gaseous hydrogen sulfide-containing mixtures having a hydrogen sulfide content of not more than about 15 mol percent.

This particular improvement is directed to the so-called "split-flow" process employed in cases where the percentage of combustibles in the hydrogen sulfide-containing gas is less than about 40 mol percent. In this process as much of the acid gas as possible, without adversely affecting combustion stability, is fed to a waste heat boiler with sufficient air to convert one-third of the total hydrogen sulfide fed to the plane and all hydrocarbon fed to the boiler, to sulfur dioxide, carbon dioxide, and water. The excess hydrogen sulfide fed to the boiler prevents sulfur trioxide formation, avoiding corrosion problems and permits some free sulfur to be formed, which improves the yield over that obtained when only one-third of the acid gas is fed to the burner. Because the boiler feed is oxidized more completely with the resulting higher flame temperature, combustion can be sustained with gas containing less hydrogen sulfide than is required by methods in which all of the gas is fed to the boiler. However, with hydrogen sulfide concentrations in the range of 10 to 15 percent or lower, it is difficult to maintain stable combustion conditions in the split-flow process. Accordingly, with feeds of such low hydrogen sulfide content, stabilization of combustion is usually obtained by either preheating the air or acid gas streams, or by the addition of supplemental hydrocarbon fuel. Both of these methods, however, result in higher operating costs, and the use of supplemental fuel often causes carbon contamination of the product sulfur.

It is accordingly an object of our invention to provide a method for recovering free sulfur from sour gas via the split-flow process wherein a stable combustion is maintained at low hydrogen sulfide concentrations through the use of product sulfur as the supplemental fuel to sustain combustion at an even rate. It is another object of our invention to produce free sulfur having little or no carbon contamination. It is a further object of our invention to recover free sulfur from sour gases containing not more than about 15 mol percent hydrogen sulfide by use of the split-flow process wherein elemental sulfur with its separate air supply is burned at the center of the burner and the air-hydrogen sulfide-containing gas mixture undergoes combustion at or near the burner periphery. It is a still further object of our invention to provide a method whereby the formation of sulfur trioxide in the system is held to a minimum.

We have now discovered that when employing the split-flow process using a gas containing hydrogen sulfide in a concentration of not more than about 15 mol percent, stable flame temperatures in the combustion zone can be maintained by burning sufficient product sulfur along with the acid gas to produce a temperature above about 1500° F. This provides a simple way of reducing the allowable hydrogen sulfide concentration that can be processed by the split-flow method without the operating expense of fuel gas for preheating or for supplemental fuel. It also avoids the problem of carbon contamination of the product sulfur. In carrying out the process of our invention, stable combustion conditions can be maintained when burning low hydrogen sulfide content gas by burning free sulfur using a separate air supply with slightly less than the stoichiometric air to produce sulfur dioxide. The sulfur is preferably burned in a spray type or equivalent burner and the resulting hot combustion products blended at the burner with hydrogen sulfide and sufficient air or oxygen-containing gas to convert the hydrogen sulfide to sulfur dioxide.

In the accompanying drawing, hydrogen sulfide-containing gas from a conventional amine sweetening system, or other common source, flows through line 2 into acid gas scrubber 4 and then through line 6 from which a portion of the stream is diverted into line 8, while the remainder goes into burner 10. Air is taken into the system through line 12, blower 14, lines 16 and 17, and into burner 10 where it combines with the hydrogen sulfide present and converts the latter into sulfur dioxide. The total volume of air employed in the burner generally corresponds to the stoichiometric amount required to produce sulfur from all of the hydrogen sulfide in the feed. Acid gas as it goes into the burner is at a temperature of about 100° F. while the air introduced via lines 16 and 17 is at about 150° to about 200° F.

At the center of burner 10, sulfur at about 275° F. and air at about 150° to about 200° F. are introduced via lines 18 and 20, respectively, and then into central tube or pipe 22. The air in line 20 (coming from line 16) is so proportioned that it is slightly less than the amount stoichiometrically required to convert the sulfur in line 18 to sulfur dioxide. In order to provide adequate mixing of air and free sulfur in tube 22, the air in line 20 could be introduced at about 50 p.s.i. so as to effect atomization of the sulfur. The acid gas and air streams flowing through lines 6 and 17, respectively, enter burner 10, mix with combustion products from tube 22 and form a final mixture at the discharge from the burner having a temperature above about 1500° F. Under these conditions a smooth combustion operation is maintained in furnace 24.

For example, with an acid gas containing 10 percent hydrogen sulfide, the furnace flame temperature, quantity of sulfur recycle to the burner, and the percent of acid gas through the burner would be related as shown in the table below.

TABLE

| Furnace flame temperature (° F.) | Lb. atoms sulfur burned per 100 mols hydrogen sulfide in acid gas | Percent of the acid gas through burner |
|---|---|---|
| 1,496 | 0 | 40.0 |
| 1,750 | 17.2 | 26.2 |
| 2,000 | 28.1 | 17.5 |

The combustion products from burner 10 discharge into furnace 24 and thereafter are conducted into high pressure boiler 26 where they are withdrawn therefrom in two separate streams, i.e., lines 28 and 30, subsequently blended, and thereafter mixed with 100°. Acid gas in line 8 prior to introduction into reactor 32 via line 34. The temperature of the mixture introduced into reactor 32 is preferably about 450° F. One way, of course, to control the operation so that this temperature is obtained is by controlling the flow rates through lines 28 and 30. The gas in line 28 having gone through two passes in the boiler is at a temperature lower than the gas in line 30 which has gone through only one pass. Reaction products and unconverted gases emerge from line 36 and enter exchanger 38 where they are cooled to about 300° F. before entering condenser 40 via line 42. Liquid sulfur at about 300° F. is withdrawn from condenser 40 through line 44 and run into sulfur storage pit 46. The uncondensed portion in condenser 40 is taken through line 48, heat exchanger 38, and line 50 after which it is introduced into a second reaction vessel 52 at about 450° F. Gaseous products are removed from reactor 52 through line 54 and introduced into condenser 40 from which liquid product sulfur free of carbon is removed and transferred to storage pit 46 via line 56. Uncondensed gases are removed from the system via line 58.

Sulfur stored in pit 46 is removed by the aid of pump 60 via line 62 and sent to storage. A portion of the product sulfur is taken from the line 62 and sent to burner 10 via line 18, as previously mentioned.

By treatment of low hydrogen sulfide content streams in accordance with our invention, sulfur is recovered in greater yield with lower air requirement than obtainable in previous split-flow designs using supplemental hydrocarbon fuel and requiring preheating the acid gas. Also in the process of our invention, operating costs are lower because the need for supplemental fuel and its corresponding air and preheating the acid gas are eliminated. The yield of sulfur by our process is higher than is obtained with prior split-flow methods because of less dilution of the vent gas with excess carbon dioxide and water resulting from burning of hydrocarbons, and less reversal of the reaction equilibrium by the increased water content. Sulfur trioxide formation is also minimized by our process.

We claim:

1. In a method for the recovery of free sulfur from a gaseous mixture containing hydrogen sulfide by means of the split flow process wherein only a minor amount of said mixture is diverted into a combustion zone and the hydrogen sulfide in the diverted portion is converted to sulfur diovide and the hydrogen sulfide content of said mixture does not exceed about 15 mol percent thus causing unstable combustion conditions in said zone, the method for stabilizing combustion in said zone which comprises burning in said zone molten free sulfur and oxygen-containing gas, said oxygen-containing gas and molten sulfur being introduced into said zone through separate confined paths and the oxygen content of said gas being slightly less than the amount stoichiometrically required to produce sulfur dioxide from said molten sulfur, simultaneously introducing into said zone from about 17 to about 40 percent of said mixture together with a sufficient quantity of oxygen-containing gas to convert the hydrogen sulfide therein to sulfur dioxide and water, and blending in said zone the sulfur dioxide formed from the burning of said molten sulfur with said hydrogen sulfide mixture and oxygen-containing gas to produce sulfur dioxide from said hydrogen sulfide under conditions whereby the formation of sulfur trioxide is held to a minimum, the amount of free sulfur supplied to said zone being at least sufficient together with the hydrogen sulfide present in said zone to generate a temperature in said zone of at least about 1500° F.

2. The method of claim 1 in which the mixture of oxygen-containing gas and hydrogen sulfide is burned in a substantially annular pattern around the free sulfur-oxygen containing gas mixture.

3. The method of claim 1 in which air is employed as the oxygen containing gas.

4. The method of claim 1 wherein the quantity of free sulfur employed in said combustion is sufficient to produce a temperature in said zone of from 1500° F. to about 2000° F.

5. The method of claim 1 in which the hydrogen sulfide content of said gaseous mixture ranges from about 10 to about 15 mol percent.

6. The method of claim 1 in which the gaseous mixture containing hydrogen sulfide is derived from a sour gas sweetening unit.

7. The method of claim 4 wherein the mixture of oxygen-containing gas and hydrogen sulfide is burned in a substantially annular pattern around the free sulfur-oxygen containing gas mixture.

References Cited

UNITED STATES PATENTS

| 2,384,926 | 9/1945 | Jones | 23—225 |
| 3,317,281 | 5/1967 | Grekel | 23—225 |

FOREIGN PATENTS

| 590,888 | 1/1960 | Canada. |
| 1,032,722 | 6/1958 | Germany. |

OSCAR R. VERTIZ, *Primary Examiner.*

G. PETERS, *Assistant Examiner.*